United States Patent
Caporaletti et al.

(10) Patent No.: US 6,541,189 B1
(45) Date of Patent: Apr. 1, 2003

(54) APPARATUS AND METHOD OF MARKING POLYMER-BASED LAMINATES

(75) Inventors: Omar Caporaletti, Mississauga (CA); Nikolay Stoev, Toronto (CA)

(73) Assignee: Agra Vadeko Inc., Ontario (CA)

(*) Notice: Subject to any disclaimer, the term of this patent is extended or adjusted under 35 U.S.C. 154(b) by 0 days.

(21) Appl. No.: 09/396,393

(22) Filed: Sep. 15, 1999

(30) Foreign Application Priority Data

Sep. 16, 1998 (GB) .............................. 9820137

(51) Int. Cl.[7] .............................. B42D 15/10; G03C 3/00
(52) U.S. Cl. ................. 430/396; 430/945; 430/322; 430/320; 216/65; 428/200; 428/203; 428/201; 428/42.1
(58) Field of Search ............... 430/945, 322, 430/396, 320; 216/65; 428/200, 203, 201, 42.1

(56) References Cited

U.S. PATENT DOCUMENTS

| | | | |
|---|---|---|---|
| 4,507,346 A | 3/1985 | Maurer et al. ............ 428/204 |
| 4,544,181 A | 10/1985 | Maurer et al. ............. 283/74 |
| 4,579,754 A | 4/1986 | Maurer et al. ............ 428/203 |
| 4,597,592 A | 7/1986 | Maurer et al. ............. 283/75 |
| 4,714,656 A | * 12/1987 | Bradshaw et al. ......... 430/945 |
| 4,740,269 A | 4/1988 | Berger et al. ............. 216/65 |
| 4,766,026 A | 8/1988 | Lass et al. .............. 428/203 |
| 4,992,347 A | * 2/1991 | Hawkins et al. ........... 430/396 |
| 5,380,695 A | * 1/1995 | Chiang et al. ............ 428/203 |
| 6,001,893 A | * 12/1999 | Vaidya et al. ............ 522/121 |

FOREIGN PATENT DOCUMENTS

| | | |
|---|---|---|
| CA | 1245448 | 11/1988 |
| DE | 1963478 | 1/1998 |
| DE | 19630478 | 1/1998 |
| DE | 19732306 | 1/1999 |
| EP | 0364731 | 4/1990 |
| EP | 0710570 | 5/1996 |
| WO | WO95/26274 | 10/1995 |
| WO | WO9534623 | 12/1995 |

OTHER PUBLICATIONS

H. Esrom, et al., "Modification of surfaces with new excimer Uvsources," *Thin Solid Films* 218 (1992) 231–246.

* cited by examiner

*Primary Examiner*—Mark F. Huff
*Assistant Examiner*—Daborah Chacko-Davis
(74) *Attorney, Agent, or Firm*—Connolly Bove Lodge & Hutz LLP

(57) ABSTRACT

A method of marking a polymer-based laminate including a core layer, a cover layer on at least one side of said core layer and an adhesive layer acting between the core layer and the cover layer is provided. The core, adhesive and cover layers have different radiation transmission coefficients. The method comprises the step of selectively irradiating the laminate with laser radiation having a fluence sufficient to mark the adhesive layer at selected locations while maintaining the cover layer intact.

21 Claims, 4 Drawing Sheets

| TYPE | THRESHOLD FLUENCE | DAMAGE FLUENCE |
|---|---|---|
| CLEAR | 0.069 mJ/cm$^2$ | 0.125 mJ/cm$^2$ |
| SILVER | 0.052 mJ/cm$^2$ | 0.122 mJ/cm$^2$ |
| GOLD | 0.055 mJ/cm$^2$ | 0.116 mJ/cm$^2$ |
| CLEAR [1] | ------------ | 0.122 mJ/cm$^2$ |

APPARATUS AND METHOD OF MARKING POLYMER-BASED LAMINATES

FIELD OF THE INVENTION

The present invention relates to a method of marking polymer-based laminates used during the production of documents such as for example identification cards, credit cards and banknotes.

BACKGROUND OF THE INVENTION

Identification cards, credit cards etc. as well as some banknotes are often formed of polymer-based laminates. Marking these cards and banknotes is common practice to deter forgery and allow counterfeit cards and banknotes to be readily detected. Ideally, these markings are placed within the laminates without damaging their skins so that security features do not have to be incorporated into the manufacturing process of the polymer. Many techniques have been devised to mark cards using laser radiation to satisfy the above.

For example, U.S. Pat. No. 4,507,346 to Maurer et al discloses a multi-layer identification card and method of making the same. The identification card includes an inlay on which a thermosensitive coating is applied. A synthetic layer is disposed on the inlay and on the thermosensitive coating and includes a blowing agent. A laser beam recorder is used to activate the blowing agent and the thermosensitive coating to personalize the identification card.

U.S. Pat. No. 4,597,592 to Maurer et al discloses a multi-layer identification card with duplicate data. The identification card includes a backing, an opaque middle layer and a cover film. Characters are burned primarily in the opaque middle layer using a laser.

U.S. Pat. Nos. 4,544,181 and 4.579,754 to Maurer et al disclose a multi-layer identification card including an inner opaque layer surrounded by upper and lower cover sheets. A photograph and two data areas are provided on the inner opaque layer. A magnetic strip is laminated on the under surface of the lower cover sheet. The inner opaque layer may be coated with a thermosensitive dye. Alphanumeric indicia is printed on the inner opaque layer by burning or blackening the inner opaque layer using a laser beam.

As will be appreciated, since the above described techniques use lasers to mark cards, the marking techniques are non-contact, fast and environmentally safe due to the fact that no consumables are involved in the marking process. However, improvements to marking techniques are continually being sought.

It is therefore an object of the present invention to provide a novel apparatus and method of marking a polymer-based laminate.

SUMMARY OF THE INVENTION

According to one aspect of the present invention there is provided a method of marking a polymer-based laminate including a core layer, a cover layer on at least one side of said core layer and an adhesive layer acting between said core layer and said cover layer, said core, adhesive and cover layers having different radiation transmission coefficients, said method comprising the step of:

selectively irradiating said laminate with laser radiation having a fluence sufficient to mark said adhesive layer at selected locations while maintaining said cover layer intact.

Preferably, the fluence is in the range of from about 0.06 $mJ/cm^2$ to 0.1 2 $mJ/cm^2$. During the step of irradiating, it is preferred that the selected areas of the cover layer are irradiated with at least one pulse of laser radiation and that the laser radiation is patterned prior to irradiating the cover layer. It is also preferred that the spatial distribution of the laser radiation is adjusted prior to irradiating the cover layer.

According to another aspect of the present invention there is provided an apparatus for marking a polymer-based laminate comprising:

a source of laser radiation to generate a beam of laser radiation having a fluence in the range of from about 0.06 $mJ/cm^2$ to 0.12 $mJ/cm^2$;

a beam adjuster to adjust the spatial distribution of said beam; and a focusing lens to focus said adjusted beam onto a polymer-based laminate to be marked.

Preferably, the beam adjuster includes a beam homogenizer and a field lens. It is also preferred that the source is an Excimer laser and wherein the beam of laser radiation has a wavelength equal to about 248 nm.

According to yet another aspect of the present invention there is provided a polymer-based laminate comprising:

a core;

a cover surrounding said core; and adhesive acting between said core and said cover, wherein said core, adhesive and cover have different radiation transmission coefficients and wherein said adhesive includes at least one marking thereon resulting from exposure of said laminate to laser radiation having a fluence sufficient to mark said adhesive while maintaining said cover intact.

The present invention allows polymer-based laminates used to form valuable documents, to be marked in a secure, non-contact manner after the polymer manufacturing process. This is achieved by marking the adhesive acting between the core and the skin of the laminate using laser radiation.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

The present invention relates to an apparatus and method for marking a polymer-based laminate used to form documents such as for example, identification cards, credit cards etc. or banknotes. The marking process is performed after the polymer-based laminate is formed so that security features do not have to be incorporated into the manufacturing process of the polymer.

Figure 1:
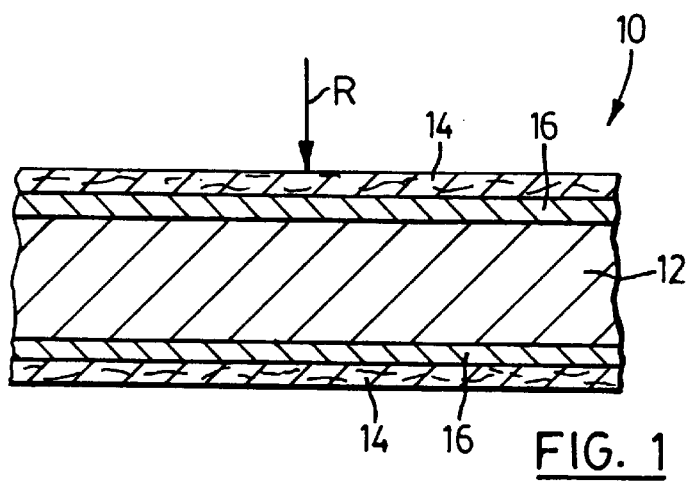
FIG. 1 is a cross-sectional view of a polymer-based laminate to be marked using laser radiation.

In the present embodiment, the polymer-based laminate 10 to be marked is used to form banknotes and includes a transparent film core 12 formed of oreinted polypropylene (OPP) and an outer skin or cover layer 14 formed of high-density polyethylene surrounding the core (see FIG. 1). The skin is bonded to the core by high bond strength adhesive 16. The core 12, skin 14 and adhesive layer 16 have different radiation transmission coefficients. The films used in the laminate 10 provide high tensile strength and deadfold characteristics. The thickness of the laminate is generally in the range of from about 80 to 110 $\mu$m. To facilitate printing, the core 12 and/or skin 14 can be coated with opacifiers and print caps. Antistats and friction reducers can also be provided on the outer surface of the laminate to improve handling.

To mark the polymer-based laminate, the polymer-based laminate is exposed to laser radiation R which marks the adhesive layer 16 between the skin 14 and core 12 without damaging the skin 14. This of course allows security features to be incorporated within the polymer-based laminate 10 after the polymer manufacturing process and without compromising the surface of the laminate.

Figure 2:
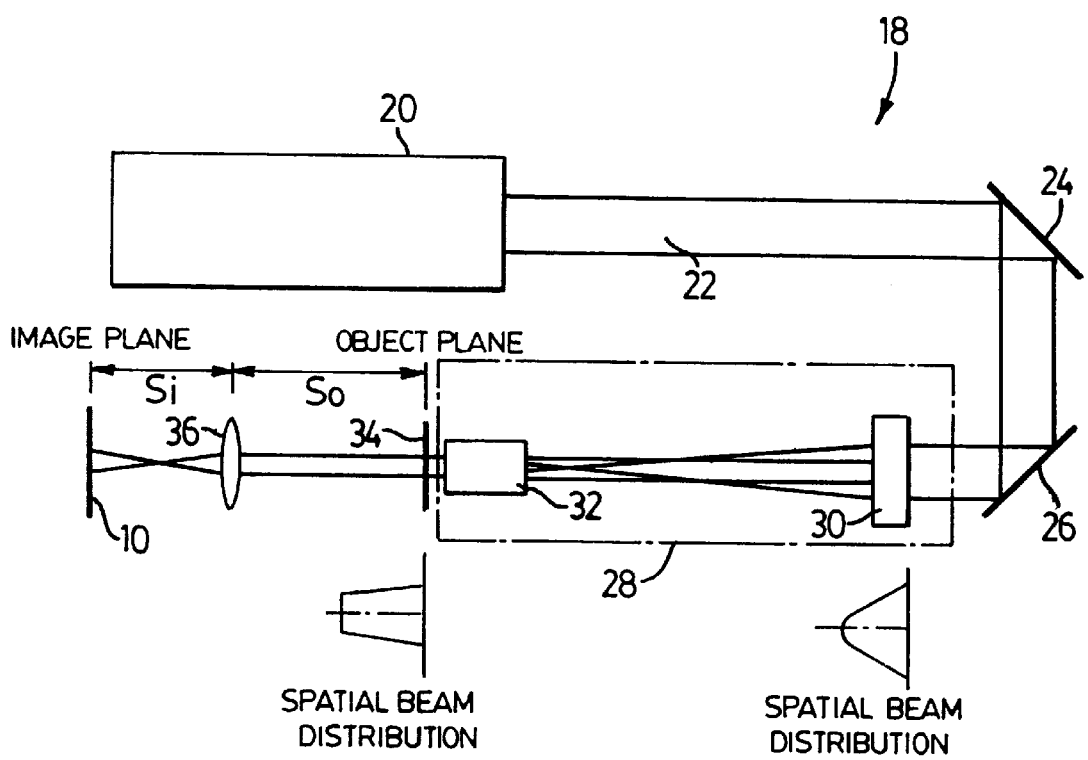
FIG. 2 is a schematic diagram of an apparatus for marking polymer-based laminates in accordance with the present invention.

Turning to FIG. 2, an apparatus 18 to mark the polymer-based laminate via pattern imaging is shown. As can be seen, the apparatus 18 includes an Excimer laser 20 generating a beam of laser radiation 22 having a wavelength equal to 248 nm and a fluence in the range of from about 0.06 mJ/cm$^2$ and 0.12 mJ/cm$^2$. A pair of mirrors 24 and 26 redirect the beam of laser radiation 22 to a beam profile adjuster 28 including a beam homogenizer 30 and a field lens 32. The beam of laser radiation 22 exiting the beam profile adjuster 28 passes through a mask 34 to a focusing lens 36 before impinging on the polymer-based laminate 10 to be marked. In this particular embodiment, the focusing lens 36 is a doublet lens with a focal length equal to approximately 100 mm.

The beam profile adjuster 28 reduces variations in the spatial intensity distribution of the beam of laser radiation 22 to produce a generally uniform energy distribution in the beam. The beam homogenizer 30 includes four cylindrical lenses, two in the vertical plane and two in the horizontal plane. The lenses are arranged to focus energy from the outer edges of the beam profile back towards the central region of the beam profile in a manner so that the outer edges of the beam profile become comparable to the central region in intensity. The beam of laser radiation 22 exiting the beam homogenizer 30 is directed towards the field lens 32 to improve the coupling of the apparatus 18 and reduce aberrations. Specifically, the field lens 32 creates a top hat distribution at the plane of the mask 34 and collimates the beam of laser radiation 22 so that basically all of the light exiting the mask 34 passes through the focusing lens 36. By patterning the laser radiation, the laser radiation irradiates the polymer-based laminate at selected locations to mark the polymer-based laminate as desired.

Tests using the apparatus of FIG. 2 and a mask 34 of the letter "E" were performed on samples of polymer-based laminates. In this particular example, the polymer-based laminates included a three ply clear lamination with an inner core 12 made of oriented polypropylene of the type sold under the name Bicor LBW by Mobil Films and having a thickness between about 25 or 30 microns. The core provided the desired tensile strength and deadfold characteristics. The core 12 was sandwiched between two outer high density polyethylene cover films 14 of the type sold under the name Hicor 115 THD by Mobil Films and having a thickness of about 30 microns. The outer cover films also provided good deadfold characteristics.

The two outer cover films 14 were adhered to the core 12 via a 100% solids adhesives 16, made for example by the Fuller Co. The outer cover films 14 were coated with two layers of an opacifying coating to make the laminate opaque and two layers of print caps to make the surface printable by all the standard banknote printing methods. Antistats and coefficient of friction reducers were used to improve handling. The laminate 10 was ready to print and did not require an overlacquer to protect the printing. The adhesive 16 was either clear, silver or gold in appearance as a result of an image printed on the core 12 using metallic inks.

Figure 3:
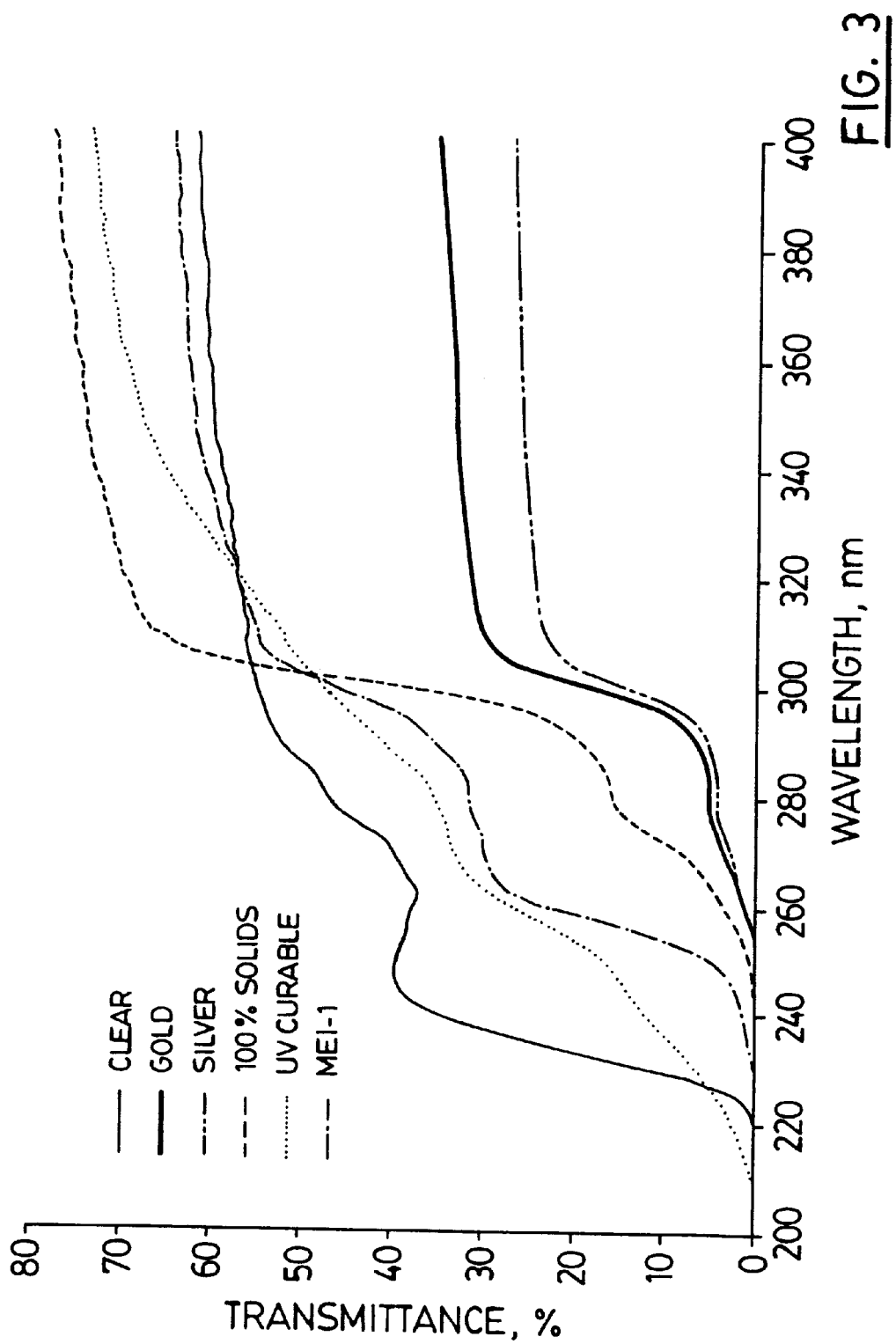
FIG. 3 is a graph showing the spectra of various polymer-based laminates exposed to Excimer laser radiation.
Figures 4, 5:
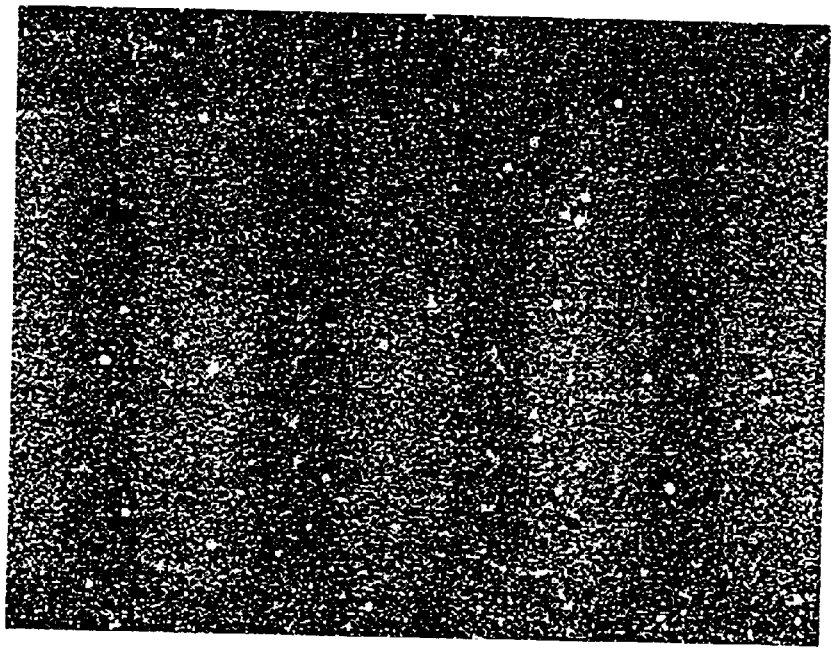
FIG. 4 is a table showing threshold and damage fluences for some of the polymer-based laminates illustrated in FIG. 3.
FIG. 5 illustrates a polymer-based laminate marked with bar codes using the apparatus of FIG. 2.

FIG. 3 shows the spectra of the polymer-based laminates tested. Threshold fluence and damage fluence were also determined for each of the samples. Threshold fluence represents the fluence where the letter is barely legible and indicates the lower energy limit to achieve marking of the polymer-based laminates. Damage fluence represents the fluence where the laminate begins to bubble. FIG. 4 shows the relevant threshold levels for marking and damage. As can be seen, the fluence thresholds for the various tested samples are similar and are generally in the range of from about 0.06 mJ/cm$^2$ to 0.12 mJ/cm$^2$.

Figure 6:
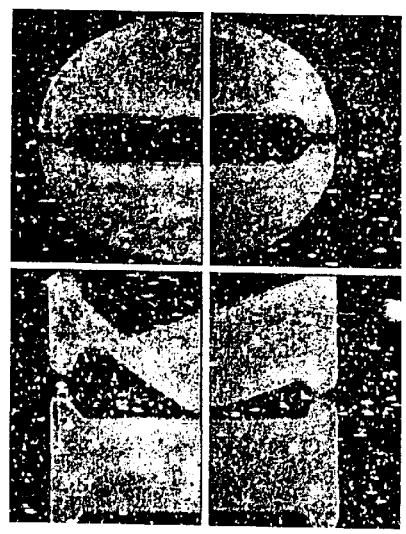
FIG. 6 illustrates a polymer-based laminate marked with lettering using the apparatus of FIG. 2.
Figure 6:
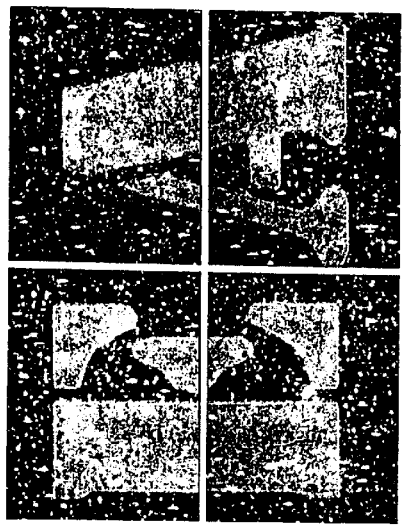
Figure 6:
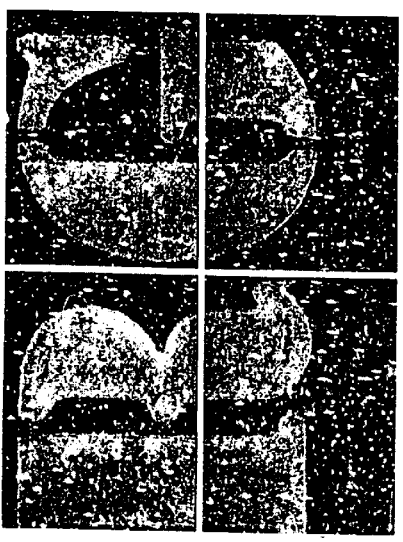

FIGS. 5 and 6 show polymer-based laminates marked using the apparatus of FIG. 2. As can be seen in FIG. 5, the adhesive 16 of the polymer-based laminate was marked with bar codes having a length of 150 microns. The bar codes are spaced apart a distance equal to 75 microns. As will be appreciated, these bar codes can be read with machine vision.

FIG. 6 shows images of a clear polymer-based laminate having its adhesive marked with letters. The images were taken with enhanced contrast using phase contrast techniques. Thus, in true visual contrast, the letters appear as being more opaque than the unmarked laminate. The letters are 2 mm in height.

To enhance contrast between the markings and the unmarked laminate, photosensitive dyes compatible with the polymers can be incorporated into the polymer-based laminate during the manufacturing process. As is well known, the photosensitive dyes undergo a color change when exposed to laser radiation to enhance the color contrast of the markings and the unmarked laminate.

As will be appreciated, since the fluence required to mark the polymer-based laminate is in the range of from about 0.06 mJ/cm$^2$ to 0.12 mJ/cm$^2$, which is low, it is easily attained allowing marks to be made in the adhesive layer of the polymer based laminate in a single laser pulse. The polymer-based laminate can be exposed to multiple pulses to enhance marking contrast; however care must be taken to avoid over exposure which may result in bubbling of the laminate.

Although a particular polymer-based laminate has been described those of skill in the art will appreciate that other film types can be used to form the polymer-based laminates provided the tensile strength and deadfold characteristics are maintained. Also, although the adhesive has been described as being a 100% solids adhesive, other adhesives such as UV curable and solvent based adhesives can be used.

Those of skill in the art will also appreciate that variations and modifications may be made without departing from the spirit and scope thereof as defined by the appended claims.

We claim:

1. A method of marking a polymer-based laminate including a core layer, a cover layer on at least one side of said core layer and an adhesive layer acting between said core layer and said cover layer, said core, adhesive and cover layers having different radiation transmissions coefficients, said method comprising the step of:

irradiating said laminate with laser radiation at selected locations, said laser radiation having a fluence selected to utilize optical absorption of said cover, core and adhesive layers so that said laser radiation marks said adhesive layer at said selected locations while maintaining said cover layer intact.

2. The method of claim 1 wherein said fluence is in the range of from about 0.06 mJ/cm$^2$ to 0.12 mJ/cm$^2$.

3. The method of claim 2 wherein said laser is an Excimer laser and wherein said laser radiation has a wavelength equal to about 248 nm.

4. The method of claim 1 wherein during said step of irradiating, selected areas of said cover layer are irradiated with at least one pulse of laser radiation.

5. The method of claim 4 further comprising the step of passing said laser radiation through a mask prior to irradiating said cover layer so that said laser radiation irradiates only said selected areas.

6. The method of claim 5 wherein said laser radiation has a spatial intensity distribution and wherein said method further comprising the step of adjusting the spatial intensity distribution of said laser radiation prior to irradiating said cover layer.

7. The method of claim 1 wherein said laminate further includes photosensitive dye to enhance color contrast between unmarked and marked locations of said laminate.

8. The method of claim 1 wherein said core layer is formed of oriented polypropylene, said cover layer is formed of high density polypropylene and said adhesive layer is constituted by a 100% solids adhesive.

9. A method of marking a polymer-based laminate including a core layer, a cover layer on at least one side of said core layer and an adhesive layer acting between said core layer and said cover layer, said core, adhesive and cover layers having different radiation transmissions coefficients, said method comprising the steps of:

generating a beam of laser radiation having a wavelength tuned to an absorption frequency of said adhesive layer; and directing said beam of laser radiation onto said laminate for a duration sufficient to mark said adhesive layer at discrete locations without compromising said cover layer.

10. The method of claim 9 wherein said beam of laser radiation has a wavelength equal to about 248 nm.

11. The method of claim 10 wherein said beam of laser radiation has a fluence is in the range of from about 0.06 mJ/cm$^2$ to 0.12 mJ/cm$^2$.

12. The method of claim 11 wherein during said directing, said beam of laser radiation is pulsed.

13. The method of claim, 12 wherein said beam of laser radiation has a spatial intensity distribution and wherein during said generating, variations in the spatial intensity distribution of said beam of laser radiation are reduced to produce a generally uniform energy distribution in said beam of laser radiation.

14. The method of claims 13 further comprising the step of passing said beam of laser radiation through a mask prior to said directing so that said beam of laser radiation is directed onto said laminate only at said discrete locations.

15. A method of marking a polymer-based laminate including a core layer, a cover layer on opposite sides of said core layer and an adhesive layer acting between said core layer and each cover layer, said core, adhesive and cover layers having different radiation transmission coefficients, said method comprising the steps of:

generating a beam of laser radiation having a fluence in the range of from about 0.06 mJ/cm$^2$ to 0.12 mJ/cm$^2$ to utilize optical absorption of said cover, core and adhesive layers; and directing said beam of laser radiation onto at least one cover layer of said laminate for a duration sufficient to mark said adhesive layer at discrete locations without compromising said at least one cover layer.

16. The method of claim 15 wherein said laminate is marked with a bar code.

17. The method of claim 15 wherein said laminate is marked with indicia.

18. The method of claim 15 wherein during said directing, said beam of laser radiation is pulsed.

19. The method of claim 18 wherein said beam of laser radiation has a spatial intensity distribution and wherein during said generating, variations in the spatial intensity distribution of said beam of laser radiation are reduced to produce a generally uniform energy distribution in said beam of laser radiation.

20. The method of claim 19 further comprising the step of passing said beam of laser radiation through a mask prior to said directing so that said beam of laser radiation is directed onto said laminate only at said discrete locations.

21. The method of claim 20 wherein said core layer is formed of oriented polypropylene, each cover layer is formed of high density polypropylene and said adhesive layer is constituted by a 100% solids adhesive, and further wherein said laser radiation has a wavelength equal to about 248 nm.

* * * * *